United States Patent
Reeves

(10) Patent No.: US 7,647,164 B2
(45) Date of Patent: Jan. 12, 2010

(54) WEB SERVICE FOR MOBILE DEVICE TRACKING

(75) Inventor: Simon Reeves, Uxbridge (GB)

(73) Assignee: Computer Associates Think, Inc., Islandia, NY (US)

( * ) Notice: Subject to any disclaimer, the term of this patent is extended or adjusted under 35 U.S.C. 154(b) by 592 days.

(21) Appl. No.: 10/828,879

(22) Filed: Apr. 21, 2004

(65) Prior Publication Data

US 2005/0251326 A1   Nov. 10, 2005

(51) Int. Cl.
  *G01C 21/00* (2006.01)
  *H04M 11/04* (2006.01)
(52) U.S. Cl. .................. 701/200; 455/404.2; 455/456.1
(58) Field of Classification Search .................. 701/200, 701/206; 455/456, 433, 466, 404.2, 456.1
See application file for complete search history.

(56) References Cited

U.S. PATENT DOCUMENTS

| | | | |
|---|---|---|---|
| 5,905,461 A * | 5/1999 | Neher | 342/357.07 |
| 6,327,535 B1 | 12/2001 | Evans et al. | |
| 6,377,810 B1 * | 4/2002 | Geiger et al. | 455/456.2 |
| 6,504,503 B1 | 1/2003 | Saint-Hilaire et al. | |
| 6,594,483 B2 | 7/2003 | Nykanen et al. | |
| 6,716,101 B1 * | 4/2004 | Meadows et al. | 455/456.1 |
| 6,750,883 B1 | 6/2004 | Parupudi et al. | |
| 2002/0042277 A1 * | 4/2002 | Smith | 455/456 |

FOREIGN PATENT DOCUMENTS

WO   WO 01/39528   5/2001

OTHER PUBLICATIONS

International Search Report issued in International Application No. PCT/US2005/013095; Sep. 15, 2005; 6 pages.

* cited by examiner

*Primary Examiner*—Dalena Tran
*Assistant Examiner*—Nicholas Kiswanto
(74) *Attorney, Agent, or Firm*—Pillsbury Winthrop Shaw Pittman LLP

(57) ABSTRACT

A method and system for providing location data of a mobile device using a web service is provided. In one embodiment, a method for providing location data of a mobile device using a web service includes receiving location data associated with a mobile device, the mobile device operable to transmit a wireless signal including corresponding location data. A location request is received from a client using a web service. The location request comprising information identifying the mobile device and the client. A response to the location request is automatically communicated based on the location data associated with the mobile device.

25 Claims, 3 Drawing Sheets

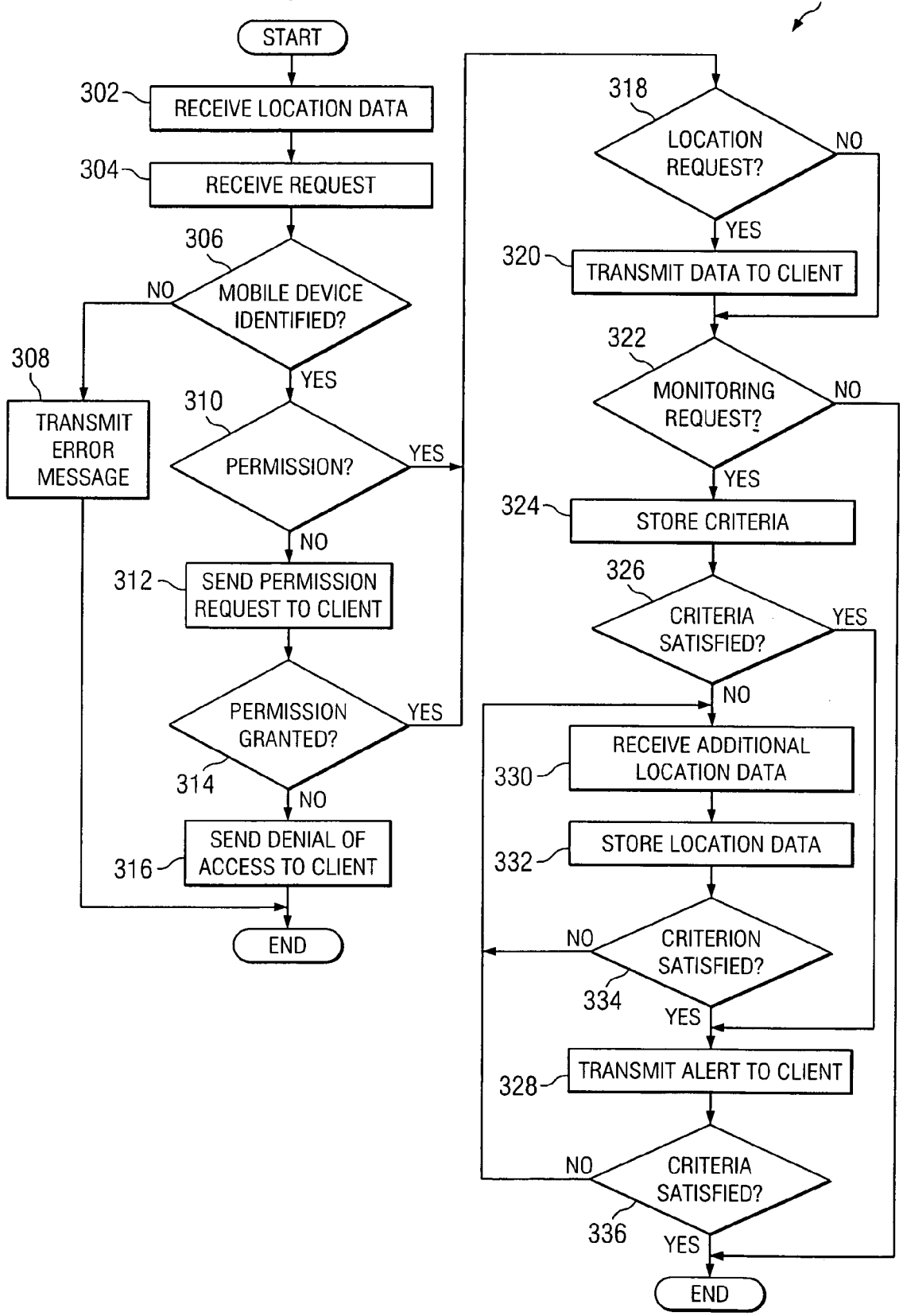

WEB SERVICE FOR MOBILE DEVICE TRACKING

TECHNICAL FIELD

This disclosure relates generally to the field of wireless devices, and more particularly to a web service for mobile device tracking.

BACKGROUND

Tracking assets, including individuals, typically requires implementing conventional communication techniques, such as email and land-based or wireless calls, to directly or indirectly determine the location of an asset. For example, an enterprise may have a need for tracking a business asset, such as an engineering team, during the course of employment. Upper management typically employs conventional means of tracking such as querying each member of the team via email. After coalescing this information, an enterprise is then in a position to make a management decision based on the availability of these assets. Current systems are limited in either their accuracy and/or the number of assets and recipients that they can economically service.

SUMMARY

A method and system for providing location data of a mobile device using a web service is provided. In one embodiment, a method for providing location data of a mobile device using a web service includes receiving location data associated with a mobile device, the mobile device operable to transmit a wireless signal including corresponding location data. A location request is received from a client using a web service. The location request comprising information identifying the mobile device and the client. A response to the location request is automatically communicated based on the location data associated with the mobile device.

BRIEF DESCRIPTION OF THE DRAWINGS

FIG. 3 is a flow diagram illustrating one embodiment of a method for providing information based on location data of a mobile device.

DESCRIPTION OF EXAMPLE EMBODIMENTS

Figure 1:
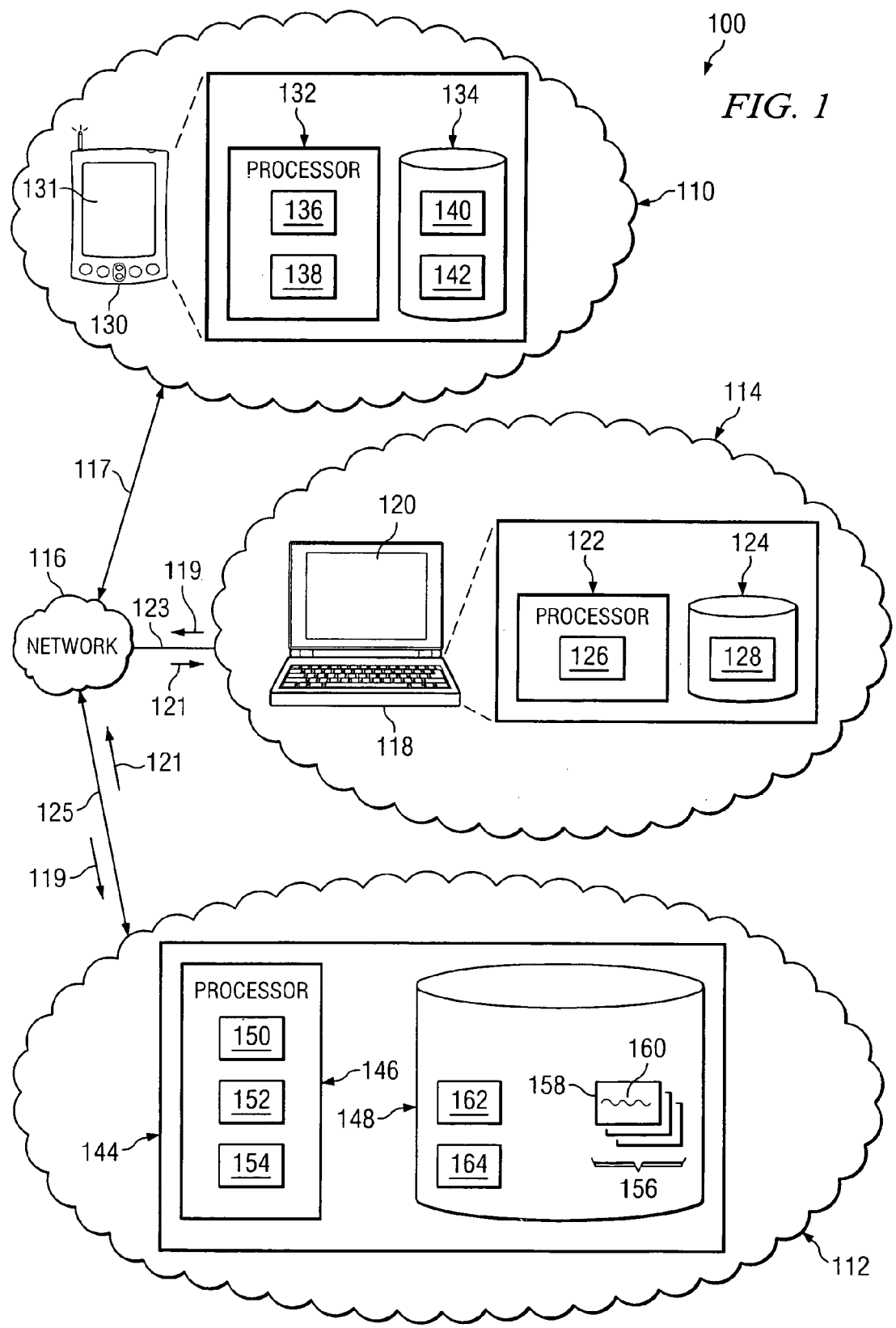
FIG. 1 illustrates one embodiment of a communications system including a server system for providing information based on location data.

FIG. 1 illustrates one embodiment of a communication system 100 that uses web services to provide information based on location data associated with a mobile device. Communication system 100 includes a mobile device system 110, a location web services system 112, a client system 114, and a network 116, such that systems 110, 112, and 114 are coupled via network 116. In general, location web services system 112 provides location data associated with mobile device system 110 to client system 114. For example, mobile device system 110 may transmit location data to location web services system 112 via network 116. Location web services system 112 stores the location data and receives a request, such as an invocation or method call, from client system 114 for the location data. Based on the request and the location data, location web services system 112 transmits a response to client system 114 using network 116.

Network 116 is a series of points or nodes of interconnected communication paths for receiving and transmitting packets of information that propagate through communication system 100 and may facilitate wireless and/or wireline communication between network devices. For example, network 116 may facilitate wireless and wireline communication between mobile device system 110 and location web service system 112. Network 116 offers a communicative interface between systems 110, 112, and 114 and may include one or more local area networks (LANs), wireless local area networks (WLANs), radio access networks (RANs), metropolitan area networks (MANs), wide area networks (WANs), all or a portion of the global network known as the Internet, and/or any other communication system or systems at one or more locations that facilitates communications in a network environment. Network 116 may implement a user datagram protocol (UDP)/internet protocol (UDP/IP) connection and use a transmission control protocol (TCP/IP) communication language protocol in particular embodiments of the present invention. Network 116 may communicate, for example, Internet Protocol (IP) packets, Frame Relay frames, Asynchronous Transfer Mode (ATM) cells, voice, video, data, and other suitable information between network addresses.

Mobile device system 110 communicates with network 116 via a wireless link 117. Mobile device system 110 may receive wireless requests from and transmit wireless responses to network 116. Wireless link 117 may employ Transmission Control Protocol/Internet Protocol (TCP/IP) to convey signals between mobile device system 110 and network 116. It will be understood that wireless link 117 may employ other suitable protocols for communicably coupling mobile device system 110 with network 116. While mobile device system 110 is illustrated as disparate from network 116, network 116 may include mobile device system 110. Mobile device system 110 may comprise one or more mobile devices, wherein each mobile device is operable to communicate with network 116. In the illustrated embodiment, mobile device system 110 includes mobile device 130.

Mobile device 130 receives and decodes wireless signals to recover encoded data and request for information and transmits wireless signals to network 116. Mobile device, as used herein, means any portable device operable to transmit a wireless signal. It will be understood that mobile device 130 may comprise a personal digital assistant (PDA), a cellular phone, a laptop computer, pager, automobile, or any other suitable processing device operable to receive and transmit wireless signals. Moreover, "mobile device 130" and "user of mobile device 130" may be used interchangeably, where appropriate, without departing from the scope of this disclosure. A user of mobile device 130 may be associate with an individual, a group, an enterprise, or any other suitable decision making body. Additionally, an asset, such an individual, a device, or any other physical object that is capable of being transported, may comprise mobile device 130. Referring to the illustrated embodiment, mobile device 130 includes a mobile interface 131, a mobile processor 132, and a mobile memory 134. Mobile interface 131 is operable to receive input from and display information to a user of mobile device 130. For example, mobile interface 131 may include buttons, keys, a display, a graphical user interface, or any other suitable interface for receiving input from and/or displaying output to a user of mobile device 130. Alternatively, mobile device 130 may comprises a wearable tag without a mobile interface 130.

Mobile processor 132 executes instructions and manipulates data to perform operations of mobile device 130, such as a location awareness engine 136 and an agent 138. Although FIG. 1 illustrates a single mobile processor 132 in mobile device 130, multiple processors 132 may be used according to particular needs, and reference to processor 132 is meant to include multiple processors 132 where applicable. In the illustrated embodiment, mobile device 130 includes location awareness engine 136 that provides location data associated with mobile device 130 based on any suitable method. Location data, as used herein, means information that identifies a location of mobile device 130. For example, location data may include a longitude, a latitude, a street address, information identifying a base station, information identifying an access point, a radial distance from at least one base station, a radial distance from at least one access point, a signal strength, a signal-to-noise ratio, a time stamp, accuracy information, any combination of the foregoing, or any other suitable information that identifies or may be used to identify a location of mobile device 130. In one embodiment, location data includes a geographic location, a time stamp, and accuracy information. "Location data" and "processed location data," i.e. information based on location data, may be used interchangeably, where appropriate.

Location awareness engine 136 may use any suitable technique for determining location data of mobile device 130. For example, location awareness engine 136 may comprise a global positioning system (GPS) engine that performs a triangulation algorithm for determining the longitude and latitude of mobile device 130 based on at least three satellite broadcast signals. In this embodiment, if a fourth satellite broadcast signal is received and processed, then the altitude of mobile device 130 may additionally be determined. In another embodiment, location awareness engine 136 may perform a triangulation algorithm based on signal strengths of cellular phone signals received by base stations. In this embodiment, mobile device 130 may transmit a cellular phone signal encoding a request for signal strength information to the base stations receiving the request. Location awareness engine 136 may determine an approximate radial distance of each receiving base station based on the corresponding signal strength of the received signal. Based on at least three radial distances and knowing the location of the corresponding base stations, location awareness engine 136 may perform a triangulation algorithm to determine a location of mobile device 130. In yet another embodiment, location awareness engine 136 may perform a triangulation algorithm based on signal strengths of wireless fidelity (Wi-Fi) or 802.11b signals received by access points or, alternatively, determine that mobile device 130 is within a certain radius of an access point (e.g., 100 meters). In this embodiment, mobile device 130 may transmit a radio frequency (RF) signal encoding a request for signal strength information to receiving access points. Location awareness engine 136 may determine an approximate radial distance from the receiving access points based on the corresponding signal strengths of each received signal. Based on at least three radial distances and knowing the location of the corresponding access points, location awareness engine 136 may perform a triangulation algorithm to determine a location of mobile device 130. It will be understood that location awareness engine 136 may use other suitable techniques to determine a location of mobile device 130. For example, location awareness engine 136 may compare a physical model of a coverage area of a wireless network, such as a Wi-Fi network, and use signal variables, such as the signal-to-noise ratio and signal strength, to predict the likely location of mobile device 130, which may not rely on triangulation. In one embodiment, mobile device 130 may be a PDA transmitting an RF signal that is accurate within a 100 meter radius. Additionally, location awareness engine 136 may rely on third generation (3G) mobile networks or other suitable technologies. 3G mobile networks include code-division multiple access (CDMA) 2000, wideband CDMA, and other versions based on the International Mobile Telecommunications (IMT)-2000, a standard developed by the International Telecommunication Union (ITU). Location awareness engine 136 may merely rely on the signal strength received by one base station or access point to determine a location of mobile device 130 within a radial distance. Location awareness engine 136 may include any hardware, software, firmware, or combination thereof operable to provide location data associated with mobile device 130. It will be understood that location awareness engine 136 is illustrated as a single multi-task module, the features and functionality performed by this engine may be performed by multiple modules.

Agent 138 comprises any engine, logic, or module operable to request location data from location awareness engine 136 and provide the location data to location web services system 112. For example, agent 138 may be based, at least in part, on software written in C++, Java, or any other suitable language. Agent 138 queries location awareness engine 136 for location data. Prior to transmitting this data, mobile device may retrieve a mobile identifier from mobile memory 134. Mobile identifier, as used herein, is any information that uniquely identifies mobile device 130. Mobile identifier may additionally provide security information such that location awareness server system 112 may verify that responses identifying mobile device 130 were transmitted from mobile device 130. After retrieving the mobile identifier, agent 130 may encode a wireless signal with the location data and mobile identifier and transmit to the wireless signal network 116 via wireless link 117. Alternatively, agent 138 may poll location awareness engine 136 based on polling information. Polling information may include a time interval for polling location awareness engine 136, instructions as to what information is requested (e.g., time stamp, technique used to determine location, allowance of technique, etc.) or other suitable information that location web services system 112 may process.

Mobile memory 134 may include any memory or data base module and may take the form of volatile or nonvolatile memory including, without limitation, magnetic media, optical media, random access memory (RAM), read-only memory (ROM), removable media, or any other suitable local or remote memory or storage component. In the illustrated embodiment, mobile memory 134 includes polling configuration file 140 and mobile device file 142.

Polling configuration file 140 comprises rules, instructions, algorithms, or any other directive used by mobile device 130 to poll a location awareness engine 136 for location data, as discussed in more detail below. In one embodiment, polling configuration file 140 comprises different polling intervals at which agent 138 polls location awareness engine 136 to retrieve location data. The polling intervals may include time intervals associated with the location determination techniques employed, or any other information that location web services system 112 may use to process location data. File 140 may be of any suitable format including XML documents, flat files, CSV files, SQL tables, relational database tables, and others.

Mobile device file 142 comprises rules, instructions, algorithms, or any other directive used by mobile device 130 to identify and to secure wireless transmissions from mobile device 130. In one embodiment, mobile device file 142 comprises a mobile identifier. As discussed above, a mobile identifier identifies mobile device 130, enabling location web services system 112 to associated location data with mobile device 130. In one embodiment, the mobile identifier may comprise an alphabetic, numeric, or alphanumeric code that is associated with mobile device 130. Mobile device file 142 may additional comprise authentication features that enable location web services system 112 to verify that location data identified as associated with mobile device 130 was not sent from another device. Authentication features may prevent or lessen the possibility of inadvertent or illicit interference with communication system 100. File 142 may be of any suitable format including XML documents, flat files, CSV files, SQL tables, relational database tables, and others.

Location web services system 112 is operable to receive, store, and process traffic from network 116 and transmit location responses 121 to client 118. While web services system 112 is illustrated as disparate from network 116, network 116 may include web services system 112. Web services system 112 may comprise a plurality of network devices operable to process location data associated with mobile device 130. In the illustrated embodiment, web services system 112 includes web services server 144.

Web services server 144 includes a server processor 146 and a server memory 148. Server 144 comprises an electronic computing device operable to receive, transmit, process, and store data associated with system 100. For example, server 144 may comprise a general-purpose personal computer (PC), a Macintosh, a workstation, a UNIX-based computer, a server computer, or any other suitable device. In the illustrated embodiment, server 144 comprises a web server. In short, server 144 may comprise software and/or hardware in any combination suitable to process location data generated by and/or associated with mobile device 130. For example, web services server 144 may provide location data, provide processed location data, such as route, speed, or any other information generated by server 144 and based on location data, automatically communicating alerts in response to location data satisfying a criteria, or provide any other suitable web service based on location data. The term "automatically," as used herein, generally means that the appropriate processing is substantially performed by at least a portion of an automated system.

FIG. 1 only provides one example of computers that may be used with the disclosure. For example, although FIG. 1 provides one example of server 144 that may be used with the disclosure, server 144 can be implemented using computers other than servers, as well as a server pool. The present disclosure contemplates computers other than general purpose computers as well as computers without conventional operating systems. As used in this document, the term computer is intended to include a personal computer, a workstation, network computer, or any other suitable processing device. Server 144 may be adapted to execute any operating system including UNIX, Windows, or any other suitable operating system.

Server memory 148 may include any memory or database module and may take the form of volatile or non-volatile memory including, without limitation, magnetic media, optical media, RAM, ROM, removable media, or any other suitable local or remote memory or storage component. In this embodiment, server memory 148 includes at least location record repository 156, permission configuration file 162, and monitoring configuration file 164 but may also include any other appropriate data. Location record repository 156 stores one or more mobile location records 158. Location record repository 156 may receive mobile location records 158 through network 116 or from another process running on server 144. Repository 156 may be any suitable format including XML documents, flat files, CSV files, SQL tables, relational database tables, and any other format operable to store one or more mobile location record 158.

Generally, each record 158 includes at least one data object 160 of any appropriate data type, including float, integer, currency, date, decimal, string, or any other numeric or non-numeric format. In one embodiment, each record 158 includes a time identifier and location data. The time identifier identifies the time at which the location data was generated by mobile device 130, such as, for example, a time stamp. Location data may include a location, a tolerance indicating the accuracy of the location, a technique identifier identifying the technique used by location awareness engine 136 to determine the location of mobile device 130, information based on any combination of the foregoing, or other suitable information associated with mobile device 130.

Permission configuration file 162 comprises rules, instructions, algorithms, or any other directive used by server 144 to determine permissions granted to client 118 regarding location data associated with mobile device 130. Permission configuration file 162 may be created, at least in part, by mobile device 130, a third party, or any other suitable user of any computer in system 100 or loaded from a default table. File 162 may be of any suitable format including XML documents, flat files, CSV files, SQL tables, relational database tables, and others.

Monitoring configuration file 164 comprises rules, instructions, algorithms, or any other directive used by server 144 to monitor mobile device 130. In one embodiment, monitoring configuration file 164 comprises criteria that is compared to location data associated with mobile device 130. As discussed above, criteria means any information that server processor 146 may compare to location data or processed location data. For example, at least one criterion may include a determination of a location of mobile device 130 within a specified distance of a second mobile device. Another example of a criterion may include a determination of mobile device 130 arriving at a geographic location. Yet another example of a criterion may include a determination of mobile device 130 entering or exiting a geographic perimeter. File 164 may be of any suitable format including XML documents, flat files, CSV files, SQL tables, relational database tables, and others.

Server processor 146 executes instructions and manipulates data to perform operations of management server 144. Although FIG. 1 illustrates a single processor 146 in server 144, multiple processors 146 may be used according to particular needs, and reference to server processor 146 is meant to include multiple server processors 146, where applicable. In the illustrated embodiment, server processor 146 includes server interface 150, web services 152, and monitoring engine 154. Server interface 150 may facilitate communication with mobile device system 110 and client system 114 via network 116. In certain embodiments, server 144 may transmit location response 121 including location data to client 118 via network 116. Interface 150 calibrates the reception of requests and the transmission of responses to these requests. Generally, interface 150 comprises logic encoded in software and/or hardware in a suitable combination and operable to communicate with network 116 via a link 125. More specifically, interface 150 may comprise software supporting one or more communications protocols associated with link 125 and network 116 hardware operable to communicate physical signals.

Web services 152 is operable to receive, decode, and respond to client request 119. In general, a "web service" is a web-based application that interacts with other web applications via network 116 using open standards, i.e., publicly available standards. For example, Simple Object Access Protocol (SOAP) and XML are current communication standards used in most web services. SOAP is a messaging protocol based on XML for accessing and promoting services on the World Wide Web. SOAP messages may be independent of operating systems used by system 100 and may be transmitted using a variety of Internet protocols, including Simple Mail Transfer Protocol (SMTP), Multipurpose Internet Mail Extensions (MIME), Hyper Text Transfer Protocol (HTTP), or any other suitable protocol. Though, web services employing SOAP do not provide web pages over network 116 but instead share business logic, data, and processes through a programmatic interface across network 116. Regarding the illustrated embodiment, web services 152 receives and decodes a client request 119 for location data associated mobile device 130. Web services 152 may extract information, including a client identifier, from client request 119, identifying client 118 and mobile device 130. In one embodiment, web services 152 compares the client identifier to permission configuration file 162 to determine if client 118 has any permissions with regard to location data associated with the identified mobile device 130. Based upon these permissions, web services 152 retrieves at least a portion of record 158 associated with the mobile device 130. After extracting the relevant data objects 160, web services 152 processes the extracted data objects 160 to generate the location response 121. In one embodiment, the location data comprises a longitude and a latitude with a statement of accuracy. In another embodiment, the location data includes a route that mobile device 130 traveled between a first and a second location. In yet another embodiment, the location data comprises a speed at which mobile device traveled over a period of time. Web services 152 transmits a location response 121 to client request 119 including the location data or processed location data. The location data or processed location data may be in any electronic format such as, for example, an XML document, flat files, CSV files, SQL tables or any other suitable format.

Monitoring engine 154 monitors location data associated with mobile device 130. In one embodiment, monitoring engine 154 may be operable to monitor location data associated with mobile device 130, compare the location data to criteria, and automatically transmit an alert in response to the location data satisfying the criteria. As used herein, automatically means that the appropriate processing is performed by an automated system. Regarding automatically transmitting a response, server 144 may perform additional processes prior to transmitting the response, such as, for example, determining permissions associated with the requestor. Monitoring engine 154 may receive a request from monitoring engine 154 for monitoring mobile device 130 based on criteria stored in monitoring configuration file 164. For example, monitoring engine 154 may automatically communicate an alert when mobile device 130 is within a specified distance of a location. Another example includes monitoring engine 154 may automatically communicate an alert when mobile device 130 leaves or exits a geographic parameter.

Client system 114 is operable to request location data associated with mobile device 130 or information based on the location data from location web services system 112. While client system 114 is illustrated as disparate from network 116, network 116 may include client system 114. Client system 114 may comprise a plurality of network devices operable to request location data associated with mobile device 130 via network 116. For example, client system 114 may comprise a plurality of clients. In the illustrated embodiment, client system 116 includes a client 118.

Client 118 may include input devices, output devices, mass storage media, processors, memory, interfaces, communication ports, or other appropriate components for communicating client requests 119 to location web services system 112 and receiving responses via network 116, such as location responses 121. Client request 119 may include a location request and information identifying client 118 and mobile device 130. The location request may include a request for location data, processed location data, such as speed, route, or other suitable information based on location data, a monitoring request, such as a request for alerts based on criteria, or other suitable information associated with mobile device 130. As used herein, a monitoring request is a request to monitor location data as compared to at least one criterion. Criteria, as used herein, means any information that location web services system 112 may compare to location data or processed location data. Location responses 121 may include location data, processed location data, alerts, or any other suitable information based on location data associated with mobile device 130. In the illustrated embodiment, client 118 includes graphical user interface (GUI) 120, client processor 122, and client memory 124. It will be understood that there may be any number of clients 118 coupled to location web services system 112. As used in this document, client 118 is intended to encompass a personal computer, workstation, network computer, kiosk, wireless data port, lap top computer, cellular phone, PDA, one or more processors within these or other devices, or any other suitable processing device. Alternatively, client 118 may include a third party application running on a processing device. Moreover, "client 118" and "user of client 118" may be used interchangeably without departing from the scope of this disclosure. For example, client 118 may comprise a computer that includes an input device, such as a keypad, touch screen, mouse, or other device that can accept information and an output device that conveys information associated with the operation of system 100, including digital data, visual information, or any other suitable information. Both the input device and output device may include fixed or removable storage media such as a magnetic computer disk, CD-ROM, or other suitable media to both receive input from and provide output to users of client 118 through a portion of a data display, namely GUI 120.

GUI 120 comprises a graphical user interface operable to allow the user of client 118 to interface with system 100 to receive data from web services system 112. Generally, GUI 120 provides the user of client 118 with an efficient and user-friendly presentation of data provided by system 100, such as charts and tables. GUI 120 may comprise a plurality of displays having interactive fields, pull-down lists, and buttons operated by the user. In one embodiment, GUI 120 presents multiple tables according to requests by client 118. It should be understood that the term graphical user interface may be used in the singular or in the plural to describe one or more graphical user interfaces in each of the displays of a graphical user interface. Further, GUI 118 contemplates any graphical user interface, such as a generic web browser, that processes information in system 100 and efficiently presents the information to the user.

Client memory 124 may include any memory or data base module and may take the form of volatile or nonvolatile memory including, without limitation, magnetic media, optical media, RAM, ROM, removable media, or any other suitable local or remote memory or storage component. In the illustrated embodiment, mobile memory 134 includes client configuration file 128. Client configuration file 128 comprises rules, instructions, algorithms, or any other directive used by client 118 to request services based on location data from web services system 112. Additionally, file 128 may include a client identifier that identifies client 118 and enables web services system 112 to associated client request 119 with client 118. Client configuration file 128 may additional comprise authentication features that enable location web services system 112 to verify that client request 119 associated with client 118 was not sent from another device. Authentication features may prevent or lessen the possibility of inadvertent or illicit interference with communication system 100. File 128 may be of any suitable format including XML documents, flat files, CSV files, SQL tables, relational database tables, and others.

Client processor 122 executes instructions and manipulates data to perform operations of client 118. Although FIG. 1 illustrates a single processor 122 in client 118, multiple processors 122 may be used according to particular needs, and reference to processor 122 is meant to include multiple processors 122, where applicable. In the illustrated embodiment, processor 122 includes network interface 126. Network interface 126 may facilitate communication with network 116. In certain embodiments, client 118 may generate a request to web services system 112 via network 116 for information based on location data associated with mobile device 130. Interface 126 calibrates the transmission of these requests and the reception of responses to these requests. Generally, interface 126 comprising the logic encoded in software and/or hardware in a suitable combination and operable to communicate with network 116 via link 123. More specifically, interface 126 may comprise software supporting one or more communication protocols associated with link 123 and network 116 hardware operable to communicate physical signals.

In one aspect of operation, server 144 receives locations data associated with mobile device 130 and stores the information in server memory 148. Server 144 may receive a client request 119 from client 118, including a location request and information that identifies the client 118 and mobile device 130. Web services 152 compares the identified client 118 to permission configuration file 162 to determine what permissions client 118 may have with regard to location data associated with mobile device 130. If the location request includes a monitoring request, Web services 152 forwards the monitoring request to monitoring engine 154. Monitoring engine 154 may store criteria in monitoring configuration file 164 and periodically compare location data associated with mobile device 130 to the criteria. In response to any criterion being satisfied, monitoring engine 154 automatically transmits an alert to client 118. If the location request does not include a monitoring request, web services 152 extracts the corresponding data from record 158 and generates a response to the location request. Web services 152 automatically transmits the location response 121 to client 118. In one embodiment, web services 152 transmits an SOAP messaging based on XML comprising location data.

Figure 2A:
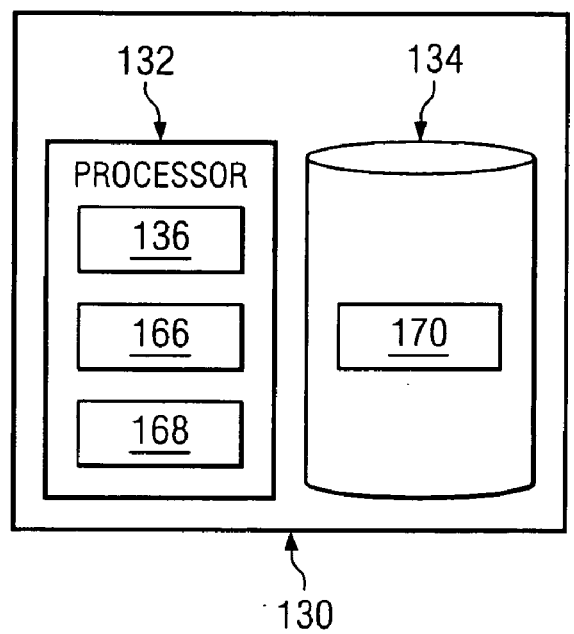
FIG. 2A-B illustrates one embodiment of implementing web services server illustrated in FIG. 1.

FIG. 2A illustrates one embodiment of implementing mobile device 130 of system 100. In the illustrated embodiment, mobile device 130 includes a mobile processor 132 and a mobile memory 134. In this embodiment, mobile processor 132 includes location awareness engine 136, mobile management engine 166, and permission interface 168. Location awareness engine 136, as discussed above, provides location data associated with mobile device 130 based on any suitable method. Mobile management engine 166 is operable to receive and decode server requests from server 144 and transmit responses to these requests. Additionally, mobile management engine 166 may query location awareness engine 136 in order to provide location data to server 144. Permission interface 168 is operable to determine what permissions client 118 has with regard to location data associated with mobile device 130. In one embodiment, permission interface 168 is configured by an administrator remotely located from mobile device 130 in which case the administrator, not mobile device 130, determines permissions of clients. It will be understood that these permissions may be In one embodiment, permission interface 168 receives a client identifier from mobile management engine 166, which may be extracted from the server request.

Mobile memory 134 includes client permission file 170. Client permission file 170 comprises rules, instructions, algorithms, or any other directive delineating permissions granted to client 118 regarding location data associated with mobile device 130. File 170 may be any suitable format including XML documents, flat files, CSV files, SQL tables, relational database tables, and others.

Figure 2B:
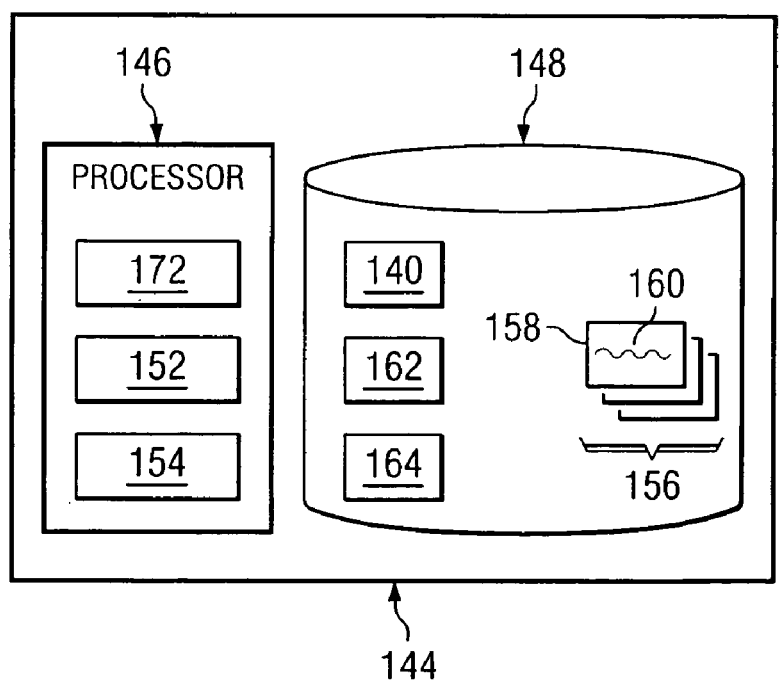

FIG. 2B illustrates one implementation of server 144 of system 100. Server 144 includes server processor 146 and server memory 148. Server memory 148 includes a polling configuration file 140, a monitoring configuration file 164, a permission configuration file 162, and a location record repository 156. As discussed in detail above, location record repository 156 includes a plurality of records 158, and each record 158 includes at least one data object 160. Monitoring configuration file 164 may include rules, instructions, and algorithms, or any other directives used by server 144 to monitor mobile device 130, which may include criteria as discussed above. Server processor 146 includes server agent 172, web services 152, and monitoring engine 154. Server agent 172 is operable to poll location awareness engine 136 of mobile device 130 based on polling configuration file 140. As discussed above, web services 152 is operable to receive and process client requests 119 and transmit location responses 121 based on location data associated with mobile device 130. Monitoring engine 154 may monitor location data of mobile device 130 and compare location data of mobile device 130 to criteria stored in monitoring configuration file 164. In response to location data satisfying a criterion, monitoring engine 154 may automatically communicate a response to client 118.

In one aspect of operation regarding FIGS. 2A and 2B, server agent 172 may transmit a server request for location data associated with mobile device 130 via network 116. Mobile management engine 166 may receive and decode the server requests and forward a request for location data to location awareness engine 136. Additionally, mobile management engine 166 may forward the server request to permission interface 168. Permission interface 168 may extract permissions associated with the location data of mobile device 130 from client permission file 170 and forward them to mobile management engine 166. Additionally, location awareness engine 136 may forward location data to mobile management engine 166. Mobile management engine 166 receives location data and permissions and encodes a wireless signal to be transmitted over wireless link 117 to server 144. Server agent 172 receives and decodes mobile device's 130 response and stores location data in location record repository 156 and permission information in permission configuration file 162. Web services 152 receives and decodes client request 119 from client 118, including requests for location data and monitoring requests. Monitoring requests are forwarded to monitoring engine 154, which extracts criteria from the monitoring request. Each criterion is stored in monitoring configuration file 164. Monitoring engine 154 monitors location data received from mobile device 130, and in response to the location data satisfying at least one criterion, an alert is automatically communicating to client 118. Regarding request for location data, web services 152 extracts the relevant portion of the record 158 corresponding to the requested location data. Web services 152 may process the extracted portion of record 158 and encode a signal with location response 121 for transmission to client 118.

FIG. 3 illustrates a flowchart of an exemplary method 300 for monitoring location data associated with a mobile device 130. Method 300 is described in respect to system 100. However, any other suitable system may use method 300 to provide location data without departing from the scope of this disclosure. Generally, method 300 describes web services 152 receiving requests for location data from client 118, processing the requests, and transmitting a response based on the location data of mobile device 130.

Method 300 begins at step 302 where web services 152 receives location data associated with mobile device 130. Location data may be stored remotely or in memory. Additionally, web services 152 may poll, receive, or otherwise collect location data associated with mobile device 130. Next, at step 304, web services 152 receives a client request 119 from client 118. Client request 119 may include a request for location data or a request for monitoring a particular criterion. At decisional step 306, if web services 152 does not identify the mobile device indicated in the client request 119 then, at step 308, an error message is transmitted to client 118 indicating that mobile device 130 is not identified, at which point processing ends. If mobile device 130 is identified by web services 152, then, at decisional step 310, web services 152 determines what permissions are available to client 118 regarding access to location data associated with mobile device 130. In one embodiment, web services 152 compares the identified client 118 to permission configuration file 162 to determine what permissions are available to client 118. If permission configuration file 162 does not grant client 118 permission to location data, web services 152 may transmit a permission request to mobile device 130 requesting permission for client 118 to have access to location data stored in location record repository 158 at step 312. At decisional step 314, if permission is not granted by mobile device 130, then web services 152 transmits a denial of access to location data message to client 118 at step 316, at which point processing ends. If permission is granted to client 118 via a response from mobile device 130 or from permission configuration file 162, then at step 318, web services 152 determines whether client request 119 includes a location request. If client request 119 includes a request for location data, then web services 152 transmits the corresponding location data to client 118, as discussed in detail above, at step 320. Method 300 proceeds to decisional step 322. If monitoring request is not included in client request 119, then method 300 ends. If a monitoring request is included in client request 119, web services 152 extracts criteria from the request and stores the criteria in monitoring configuration file 164 at step 324. At decisional step 326, if at least one of the criterion is satisfied, then, at step 328, an alert is automatically transmitted to client 118. It will be understood that the criteria may be monitored by a single or separate processes. Returning to decisional step 326, if none of the criteria are satisfied, then web services 152 receive additional location data from mobile device 130 at step 330. Next, at step 332, web services 152 stores the additional location data in location record repository 156. At decisional step 332, if at least one of the criterion is not satisfied, then method 300 returns to step 330. If at least one of the criterion is satisfied, then method 300 proceeds to step 328, at which point web services 152 transmits an alert to client 118. At decisional step 336, if all criteria are satisfied, method 300 ends. If at least one criterion is not satisfied, then method 300 returns to step 330.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for providing location data of mobile devices using a web service comprising one or more network devices, the method comprising:

receiving, by the one or more network devices of the web service, first location data and second location data respectively associated with and transmitted by a first mobile device and a second mobile device;

receiving, by the one or more network devices of the web service, a monitoring request from a client, the monitoring request comprising information identifying the first mobile device and the client, and a criteria for alerting the client when the first mobile device is within a specified distance of the second mobile device based on the first location data and the second location data;

comparing, by the one or more network devices of the web service, the first location data and the second location data to determine whether the criteria has been satisfied; and automatically communicating an alert, by the one or more network devices of the web service, to the client when the first location data and the second location data indicate that the criteria has been satisfied when the first location data and the second location data indicate that the first mobile device is within the specified distance of the second mobile device.

2. The method of claim 1, wherein the first location data comprises a geographic location and a time stamp.

3. The method of claim 1, further comprising:

determining request permissions that indicate whether the identified client may access the first location data associated with the first mobile device.

4. The method of claim 1, the criteria further comprising the first mobile device arriving at a location.

5. The method of claim 1, the criteria further comprising the first mobile device crossing a geographic perimeter.

6. The method of claim 1, further comprising:

transmitting to the client, by the one or more network devices of the web service, a route that the first mobile device travels between a first location and a second location.

7. The method of claim 1, further comprising:

transmitting to the client, by the one or more network devices of the web service, a speed that the first mobile device travels over a period of time.

8. A computer readable medium having computer-executable instructions thereon for providing location data of mobile devices using a web service, the instructions when executed on one or more computing devices configuring the one or more computing devices to:

receive first location data and second location data at the web service respectively associated with and transmitted by a first mobile device and a second mobile device;

receive a monitoring request from a client, the monitoring request comprising information identifying the first mobile device and the client, and a criteria for alerting the client when the first mobile device is within a specified distance of the second mobile device based on the first location data and the second location data;

compare the first location data and the second location data to determine whether the criteria has been satisfied; and automatically communicate an alert to the client when the first location data and the second location data indicate that the criteria has been satisfied when the first location data and the second location data indicate that the first mobile device is within the specified distance of the second mobile device.

9. The computer readable medium of claim 8, wherein the location data comprises a geographic location and a time stamp.

10. The computer readable medium of claim 8, the instructions when executed further configuring the one or more computing devices to:
determine request permissions that indicate whether the identified client may access the first location data associated with the first mobile device.

11. The computer readable medium of claim 8, the criteria further comprising the first mobile device arriving at a location.

12. The computer readable medium of claim 8, the criteria further comprising the first mobile device crossing a geographic perimeter.

13. The computer readable medium of claim 8, the instructions when executed further configuring the one or more computing devices to:
transmit to the client a route that the first mobile device travels between a first location and a second location.

14. The computer readable medium of claim 8, the instructions when executed further configuring the one or more computing devices to:
transmit to the client a speed that the first mobile device travels over a period of time.

15. A system for providing location data of mobile devices using a web service, comprising:
memory configured to store information associated with a plurality of network devices in the enterprise network; and
one or more processors configured to:
receive first location data and second location data respectively associated with and transmitted by a first mobile device and a second mobile device,
receive a monitoring request from a client, the monitoring request comprising information identifying the first mobile device and the client, and a criteria for alerting the client when the first mobile device is within a specified distance of the second mobile device based on the first location data and the second location data,
compare the first location data and the second location data to determine whether the criteria has been satisfied, and
automatically communicate an alert to the client when the first location data and the second location data indicate that the criteria has been satisfied when the first location data and the second location data indicate that the first mobile device is within the specified distance of the second mobile device.

16. The system of claim 15, wherein the first location data comprises a geographic location and a time stamp.

17. The system of claim 15, the one or more processors further configured to:
determine request permissions that indicate whether the identified client may access the first location data associated with the first mobile device.

18. The system of claim 15, the criteria further comprising the first mobile device arriving at a location.

19. The system of claim 15, the criteria further comprising the first mobile device crossing a geographic perimeter.

20. The system of claim 15, the one or more processors further configured to:
transmit to the client a route that the first mobile device travels over a period of time.

21. The system of claim 15, the one or more processors further configured to:
transmit to the client a speed that the first mobile device travels between a first and a second location.

22. A method for providing location data of a mobile device using a web service comprising one or more network devices, the method comprising:
receiving, by the one or more network devices of the web service, location data associated with and transmitted by the mobile device, wherein the location data comprises a tolerance indicating a level of accuracy of the location data;
receiving, by the one or more network devices of the web service, a location request from a client, the location request comprising information identifying the mobile device and the client;
determining, by the one or more network devices of the web service, whether the client has permission to access the location data based at least in part on the identified mobile device and the client; and
providing the client with the location data when the client is determined to have permission to access the location data.

23. The method of claim 22, the method further comprising:
retrieving a polling configuration profile comprising one or more instructions that controls when to poll the mobile device for the location data; and
wherein said receiving, by the one or more network devices of the web service, location data further comprises the mobile device being polled for the location data according to the polling configuration profile.

24. The method of claim 22, the method further comprising:
when the client is determined to not have permission to access the location data, transmitting to the mobile device, by the one or more network devices of the web service, a permission request to access the location data by the client;
receiving, by the one or more network devices of the web service, a permission response from the mobile device responding to the permission request; and
providing, by the one or more network devices of the web service, the location data when the permission response indicates that the client has permission to access the location data.

25. The method of claim 22, wherein the location data is generated by the mobile device using one of a plurality of location techniques, wherein each of the plurality of location techniques generate the location data using a different technique, and wherein the location data comprises a technique identifier that identifies the one of the plurality of location techniques that were used to generate the location data.

* * * * *